United States Patent [19]

Voll et al.

[11] Patent Number: 4,713,704
[45] Date of Patent: Dec. 15, 1987

[54] DISK STORAGE SPINDLE ARRANGEMENT

[75] Inventors: Horst Voll, Hassfurt, Fed. Rep. of Germany; Manfred Meyer, Stamford, Conn.

[73] Assignee: FAG Kugelfischer Georg Schafer (KGaA), Fed. Rep. of Germany

[21] Appl. No.: 808,881

[22] Filed: Dec. 13, 1985

[30] Foreign Application Priority Data

Dec. 19, 1984 [DE] Fed. Rep. of Germany ....... 3446269
Nov. 14, 1985 [DE] Fed. Rep. of Germany ....... 3540363

[51] Int. Cl.$^4$ ............................................. G11B 17/02
[52] U.S. Cl. ....................................... 360/97; 369/270
[58] Field of Search .................................. 360/97-99; 369/270

[56] References Cited

U.S. PATENT DOCUMENTS

| | | | |
|---|---|---|---|
| 4,306,259 | 12/1981 | Saito et al. | 360/99 |
| 4,376,997 | 3/1983 | Eggers | 360/99 |
| 4,604,665 | 8/1986 | Muller et al. | 360/97 |

FOREIGN PATENT DOCUMENTS 3018091 5/1985 Fed. Rep. of Germany .

Primary Examiner—Robert S. Tupper
Attorney, Agent, or Firm—Ostrolenk, Faber, Gerb & Soffen

[57] ABSTRACT

A spindle assembly for use with a magnetic disk or the like including a pair of bearings axially spaced by an outer ring and a shaft is posed through the outer ring. A receiving part is placed over one end of the shaft. The receiving part has a bore for receiving the outer ring. A drive motor is attached to the other end of the shaft. A housing is positioned on and directly adjacent the outer ring and extends between the drive motor and the receiving part which each have a step-down or reduced cross-section area. The housing has a bore to receive the first end of the shaft and also receives the magnetic disk. A drive motor is provided at the other end.

10 Claims, 3 Drawing Figures

DISK STORAGE SPINDLE ARRANGEMENT

BACKGROUND OF THE INVENTION

This invention relates, generally, to spindles and, more particularly, to a spindle which may be used with a diskette storage device drive.

Spindles for disk storage apparatus having pre-loaded ball bearings have been used for a significant period of time. Generally, they consist of a shaft having a force-fitted receiving part thereon with the receiving part being used to receive magnetic diskettes or the like. A rotatable shaft is mounted in a housing through the use of customary ball bearings which are axially pre-loaded towards each other by springs. The drive motor is generally attached on the end of the shaft opposite the receiving part. However, this has been found to have certain basic disadvantages.

In some present day embodiments, for space considerations in the axial direction, the mounting arrangement together with a housing has been utilized in conjunction with lengthened receiving parts. However, since magnetic disks have a standardized or given inside diameter, the radial space remaining for all machine parts arranged within the receiving part is very small. This resulted in a shaft of reduced diameter with the result that dynamic flexibility occurred. This was generally not as problematic in early drive devices since the radial spacing of information on the diskette and hence the volume of information stored thereon was relatively small. However, present day disk devices are on the order of at least four to eight times more powerful than earlier devices with the result that spacing of information is much more dense. Accordingly, dynamic flexibility caused by a reduced diameter shaft may result in errors when information is read from the magnetic medium. Further, present day arrangements use a large number of individual parts such that inaccuracies can and do result due to the accumulation of tolerances. This thereagain produce impermissibly noisy operation as well as travel of the spindle which is not as precise as necessary. The springs which act in the axial direction also produce dynamically unstable systems in some circumstances and at different periods of time. Additionally, large numbers of individual parts also result in expensive assembly costs of the spindle unit.

SUMMARY OF THE INVENTION

Accordingly, it is an object of the present invention to provide an improved well-sealed spindle so that a shaft of appropriate diameter may be utilized and thereby decrease the dynamic flexibility. Further, it is another object of the present invention to decrease the number of individual parts and thereby reduce the inaccuracies as a result of tolerance accumulation.

It is another object of the present invention to provide a device which is less expensive to assemble and thereby lower the manufacturing costs.

Additionally, it would be advantageous and is an object of the present invention to produce a device where a spindle assembly for use with a magnetic disk or the like comprises a rotatable shaft having a first end and a second end and further having an area of a stepped-down or reduced cross-sectional area adjacent the second end; a housing having the rotatable shaft disposed therethrough; a receiving part having a bore therein and being disposed adjacent the first end of the shaft for receiving the magnetic disks or the like; a drive motor disposed on the second end of the shaft and thereby opposite the receiving part; first and second axially spaced apart pre-loaded bearings, the bearings being axially urged towards each other wherein the first bearing is disposed adjacent the first end of the shaft having an inner race portion which is disposed on the shaft and the second bearing being adjacent the second end of the shaft so as to be axially displaced in relation to the stepped-down area; a ring connecting the first and the second bearings together in the axially spaced relationship and a housing fixedly attached to the outer ring so as to be adjacent the second bearing and being profiled to have an axial portion thereof disposed between the outer ring and an overlapping portion of the receiving part

BRIEF DESCRIPTION OF THE DRAWINGS

Reference may be now had to the accompanying drawings, in which.

DETAILED DESCRIPTION OF THE PREFERRED EMBODIMENTS

It has been found that the elimination of one inner ring and the single piece development of an outer ring makes possible a smaller housing which thereby results in a significant amount of space being saved. Therefore, it is possible to use a shaft of larger diameter and thereby increase the dynamic stability. The elimination of inner and outer rings also results in a greater degree of precision in the assembly process since several seating points together with the tolerances associated therewith are eliminated. Also, axial pre-loading between bearings is effected in a simplified fashion through suitable displacement of the inner ring of the other bearings on a stepped-down shaft. Therefore, when the correct position has been reached, the ring can be fixed into position by bonding or a force fit with the result that subsequent axial changes are no longer possible. In place of a single-piece outer ring, two normal outer rings can also be used which are fitted in a connecting sleeve. This also saves space since the shaft can be made of a larger diameter which, in turn, produces a greater stability. Further, in accordance with the preferred embodiment, a step is provided which corresponds approximately with the step which results from the axial load of the housing on a single-piece outer ring, with the result that two radially staggered sealing slits are formed. This therefore makes it no longer necessary to install additional seals for the purpose of preventing dirt, dust or other contaminants from entering.

As a result of another embodiment, the radius of the bore surface of the outer ring between bearings is slightly greater than the diameter of the shaft and, therefore, the stability of the outer ring is increased which results in a reduction in size of the housing for better utilization of the radially limited installation space. This also results in a long sealing slot between the shaft and the outer ring which also prevents dirt, or the like, from entering onto the magnetic disk space from below.

Additionally, an alternate deflective sealing system is also taught where helical grooves produce air flow through the bearing space in a filter-type arrangement.

Figure 1:
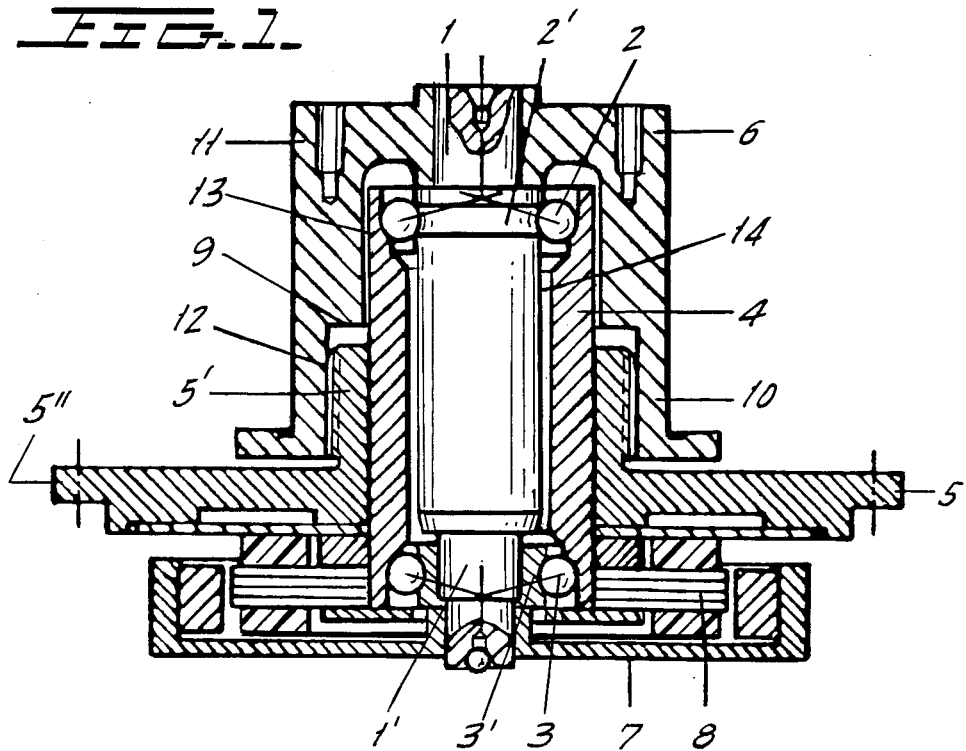
FIG. 1 is a cross-section through a disk-storage spindle with a drive motor, according to the present invention.

Referring now to FIG. 1, there is shown a shaft 1 having two bearings 2, 3 having a common outer ring 4. A housing 5 is disposed adjacent the outer ring 4. On one end of the shaft 1 is the receiving part 6 for magnetic disks or the like (not shown). The receiving part 6 is force-fitted onto the shaft 1. On the other end of the shaft 1 is a rotor 7 for the motor 8 which is fastened onto the outer ring 4 as is the housing 5. The angular ball bearing 2 has an inner race 2' which is disposed directly onto the shaft 1. The outer rings for the bearings 2 and 3 are produced as a single or unitary piece. Therefore, since the angular ball bearing 2 is arranged directly on the shaft in conjunction with the unitary nature of the bearings 2, 3, the axial portion 5' of the housing can be kept short, thereby saving space. This also allows the diameter of the shaft 1 to be as large as is possible in light of the "fixed" inner diameter of magnetic disks, over almost its entire length. The bearing 3 has a separate inner ring 3' which is arranged for axial displacement on a stepped-down section 1' (reduced diameter) of the shaft 1. When the proper axial pre-loading has been reached by the bearing it can then be fixed by bonding, or the like, to the stepped-down section 1' of the shaft 1 thereby resulting in an axially stable mounting.

The housing 5 is comprised of an axial section 5' and a radial section 5". The radial section 5" allows the spindle assembly to be fastened onto a housing or other apparatus (not shown) with which it will be used. The axial section 5' extends up to approximately the center of the outer ring 4. This, therefore, results in a step 9 to be retained in the bore surface of the receiving part 6. Due to small radial-space conditions, the wall surface of the radial housing section 5" in relation to the bore surface of the lower receiving part 10 and the wall surface of the outer ring 6 in relation to the bore surface of the upper receiving part 11 are in close proximity to each other with the result that labyrinth slits 12, 13 result. It has been found that the slits 12, 13 are normally sufficiently small such that they operate as a seal. Further, by making the radius of the bore surface of the outer ring 4 which is disposed between the ( bearings 2, 3, only slightly larger than the radius of the shaft 1, the labyrinth slit 14 results between the wall surface of the shaft 1 and the bore surface of the outer ring 4. This, therefore, results in additional sealing of the magnetic disk space from dirt, dust and other contaminants which may enter from the motor side.

Figure 2:
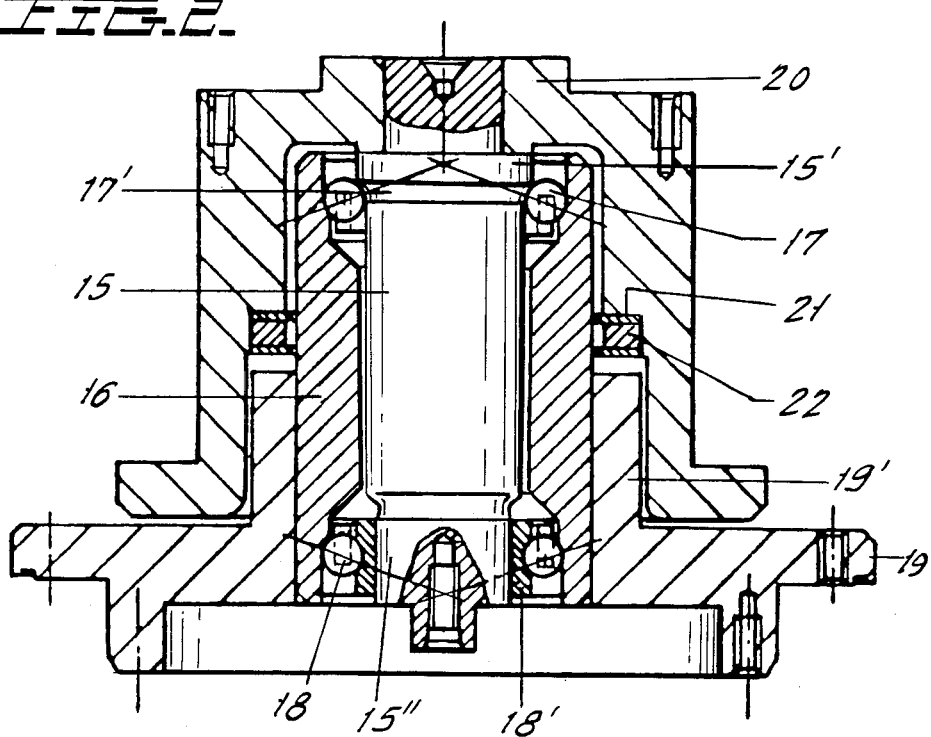
FIG. 2 shows an alternate embodiment of that shown in FIG. 1 with the use of a seal.

Referring now to FIG. 2, there is shown an alternate embodiment of the present invention. This alternate embodiment essentially consists of the shaft 15, a single-piece outer ring 16, an angular ball bearing 17, an angular ball bearing 18, having a separate inner ring 18' which is seated on a stepped-down section 15" of the shaft 15, an L-shaped housing 19 and a receiving part 20. This embodiment performs essentially the same as that of FIG. 1 with several differences. Here, the inner race 17' of the angular ball bearing 17 is formed on a stepped-down portion 15' of the shaft 15. Additionally, a seal 22, which is preferably in the form of a ferro-fluid type of seal, is provided on the step 21 of the receiving part 20. The drive motor (not shown) is attached to the shaft 15 and the housing flange 19.

Figure 3:
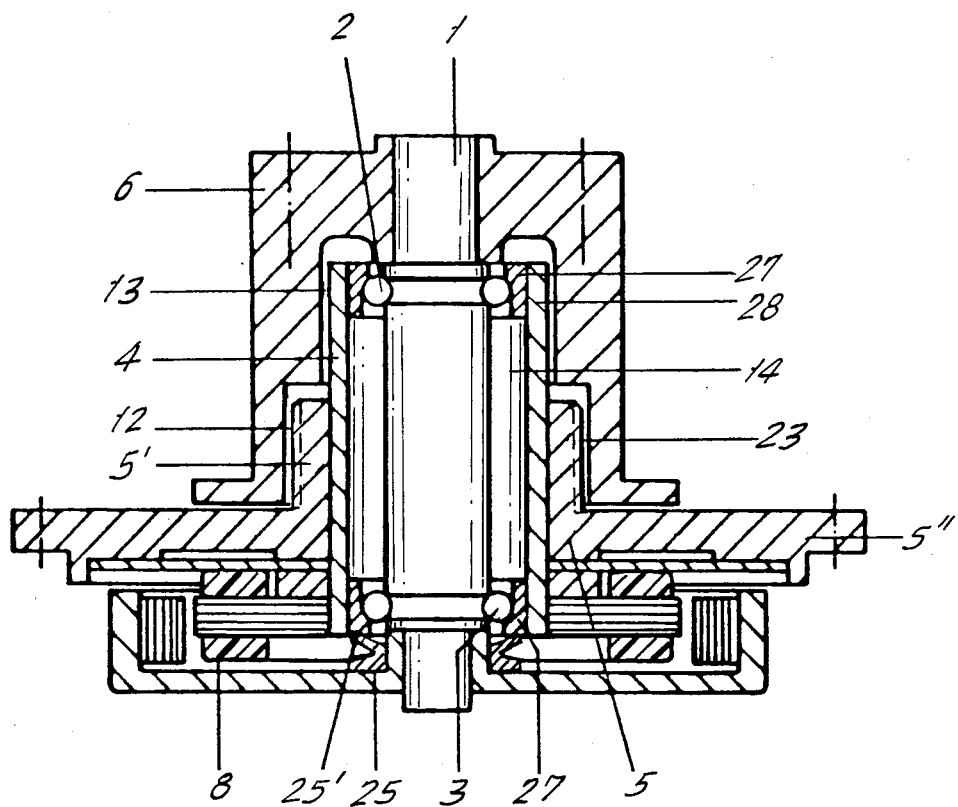
FIG. 3 shows another alternate embodiment of FIG. 1 with a different seal arrangement.

Referring now to FIG. 3, another alternate embodiment of the present invention is shown. However, the basic construction of the embodiment shown in FIG. 3 is substantially the same as in FIG. 1. Therefore, primarily only the differences will be discussed. Helically arranged grooves 23 are provided on the outer surface of the axial portion 5' of the housing 5 and provide sealing. The inclination of the grooves 23 is such that with a given constant direction of rotation of the receiving part 6, an air flow is obtained through the labyrinth slits 13, 14 towards the bearing 3. Behind the bearing 3 is a V-shaped seal 25 having a sealing lip 25'. The sealing lip 25' rests against the outer ring 27 when the spindle is at rest. However, when the spindle rotates, as a result of a slight gap 12, which is present at all times, pressure from within the spindle will increase until the sealing lip 25 which is obliquely directed, lifts off from the outer ring 27. It has also been found that centrifugal forces due to rotation of the shaft 1 will also aid in lifting of the seal 25'. As a result of this air flow, an equalization of pressure will occur within the inner area, thereby providing a filter-like effect in that dirt or other contaminants will not be able to enter into the inside of the spindle.

A further advantage to the seal 25 is that additional stiffness in the entire system can be provided, either by a long hub seat of the receiving part on the shaft or by a longer support base for the bearing 3. Also shown is the use of two separate outer rings 27 as opposed to the unitary piece in FIG. 1. The outer rings 27 are connected by a sleeve 28. Therefore, it is possible to enlarge the diameter of the shaft, about its central section or area, and thereby increase its overall stiffness. An additional advantage of this embodiment is that the seal shown in FIG. 1 which is at the upper end of the spindle may also be omitted with the result that the length of the seating place of the receiving part 6 on the shaft 1 may be increased, thereby providing additional stiffness or rigidity to the structure.

It is to be understood that many variations of the present invention may be practiced without departing from the spirit and scope of the present invention. For example, different shape seals other than a V may be utilized while various other components may take on slightly different structures, such as the housing. Further, different types of motor arrangements may be utilized while various components may be bonded as opposed to force-fitted to each other. Accordingly, the present invention produces a device which is relatively inexpensive to manufacture and assemble, providing increased sealing attributes which thereby inhibit the introduction of contaminants. Further, the present invention allows for greater dynamic stability without a penalty in increasing axial and/or radial dimensions.

What is claimed is:

1. A spindle assembly for use with a magnetic disk, or the like, comprising:
   a rotatable shaft having a first end and a second end and further having an area of a stepped-down, reduced cross-sectional area adjacent said second end;
   a housing having said rotatable shaft disposed therethrough;
   a receiving part having a bore therein and being disposed adjacent said first end of said shaft, said receiving part being for receiving said magnetic disk, or the like;
   a drive motor disposed at said second end of said shaft;

first and second axially spaced apart bearings, said first bearing being disposed adjacent said first end of said shaft, said first bearing having an inner race portion which is disposed at said shaft, said second bearing disposed at said stepped down area adjacent said second end of said shaft and being axially displaceable in relation to said stepped-down area;

outer ring means connecting said first and said second bearings together in an axially spaced relationship established by said outer ring means; said outer ring means extending into said bore of said receiving part and contacting said receiving part in the axial region near said first bearing, said bore being sized so that said receiving part is radially spaced outward from said outer ring means in the axial region away from said first bearing; and a housing fixedly attached to said outer ring means adjacent said second bearing and having an axial portion disposed in said bore of said receiving part in said axial region away from said first bearing such that said axial portion extends between said outer ring means and said receiving part.

2. A spindle assembly according to claim 1, wherein the radius of said ring means at the point between said first and said second bearing is slightly greater than the radius of said shaft.

3. A spindle assembly according to claim 2, wherein said outer ring means and said housing and receiving part are spaced to facilitate air movement through said spindle assembly upon the rotation of said shaft.

4. A spindle assembly according to claim 2, wherein a seal is disposed directly adjacent said ring means at a point where said ring means and said receiving part are in engagement.

5. A spindle assembly according to claim 1, wherein a seal is disposed directly adjacent said ring means at a point where said ring means and said receiving part are in engagement.

6. A spindle assembly according to claim 4 further comprising an annular flexible seal adjacent said second bearing and extending between said second bearing and said outer ring means when said shaft is at rest; said annular flexible seal having a portion for lying against said ring when said shaft is at rest and for lifting off said ring when said shaft is rotated.

7. A spindle assembly according to claim 1, wherein said outer ring means and said housing and said receiving part are spaced to facilitate air movement through said spindle assembly upon the rotation of said shaft.

8. A spindle assembly according to claim 1, wherein said bore of said receiving part is stepped, being narrower in said axial region near said first bearing and being stepped wider in said axial region away from said first bearing.

9. A spindle assembly for use with a magnetic disk, or the like, comprising:
a rotatable shaft having a first end and a second end and further having an area of a stepped-down, reduced cross-sectional area adjacent said second end;
a housing having said rotatable shaft disposed therethrough;
a receiving part having a bore therein and being disposed adjacent said first end of said shaft, said receiving part being for receiving said magnetic disk, or the like;
a drive motor disposed at said second end of said shaft;
first and second axially spaced apart bearings, said first bearing being disposed adjacent said first end of said shaft, said first bearing having an inner race portion which is disposed on said shaft; and said second bearing being disposed at said stepped down area adjacent said second end of said shaft and being axially displaceable in relation to said stepped-down area;
outer ring means connecting said first and said second bearings together in an axially spaced relationship established by said outer ring means; said outer ring means extending into said bore of said receiving part and contacting said receiving part in the axial region near said first bearing, said bore being sized so that said receiving part is radially spaced outward from said outer ring means in the axial region away from said first bearing;
a housing fixedly attached to said outer ring means adjacent said second bearing and having an axial portion disposed in said bore of said receiving part in said axial region away from said first bearing such that said axial portion extends between said outer ring and said receiving part; and
said outer ring means and said housing and said receiving part being spaced to facilitate air movement through said spindle assembly upon the rotation of said shaft; said air movement is facilitated by helically arranged grooves disposed on at least one of said ring means and said housing and are adjacent said receiving part such that upon rotation of said shaft, air is moved through a clearance between said housing and said overlapping portion.

10. A spindle assembly according to claim 9, wherein the radius of said outer ring means at the point between said first and said second bearing is slightly greater than the radius of said shaft.

* * * * *